US005744075A

United States Patent [19]
Klett et al.

[11] Patent Number: 5,744,075
[45] Date of Patent: Apr. 28, 1998

[54] METHOD FOR RAPID FABRICATION OF FIBER PREFORMS AND STRUCTURAL COMPOSITE MATERIALS

[75] Inventors: James W. Klett, Knoxville; Timothy D. Burchell, Oak Ridge; Jeffrey L. Bailey, Clinton, all of Tenn.

[73] Assignee: Martin Marietta Energy Systems, Inc., Oak Ridge, Tenn.

[21] Appl. No.: 444,986

[22] Filed: May 19, 1995

[51] Int. Cl.$^6$ .......................... C01B 31/02; C01B 31/04; B29C 41/16; B29C 71/02

[52] U.S. Cl. .................. 264/29.6; 264/29.1; 264/29.7; 264/553; 264/571; 264/122

[58] Field of Search .................. 264/29.6, 29.7, 264/29.1, 500, 544, 553, 126, 109, 119, 122, 571; 423/445 R, 448, 447.4, 447.7, 447.8

[56] References Cited

U.S. PATENT DOCUMENTS

| | | |
|---|---|---|
| 4,500,328 | 2/1985 | Brassel et al. |
| 4,772,508 | 9/1988 | Brassel |
| 4,818,448 | 4/1989 | Wrenn, Jr. et al. |
| 4,863,771 | 9/1989 | Freeman |
| 5,039,465 | 8/1991 | Freeman et al. |
| 5,057,254 | 10/1991 | Sohda et al. |
| 5,147,588 | 9/1992 | Okura et al. |
| 5,186,873 | 2/1993 | Uemura et al. |
| 5,236,639 | 8/1993 | Sakagami et al. |
| 5,243,464 | 9/1993 | Lauf et al. |
| 5,286,326 | 2/1994 | Greve |
| 5,313,325 | 5/1994 | Lauf et al. |
| 5,382,392 | 1/1995 | Prevorsek et al. |
| 5,390,217 | 2/1995 | Ioki et al. |

FOREIGN PATENT DOCUMENTS

| | | | |
|---|---|---|---|
| 4-16331 | 1/1992 | Japan | 264/29.1 |

OTHER PUBLICATIONS

Bruce N. Greve and Richard B. Freeman, "Rapid Production of Chopped Fiber Preforms Using a Slurry Process," *Composites in Manufacturing*, Composites Manufacturing Association of the Society of Manufacturing Engineers, vol. 10, No. 4, Fourth Quarter 1994, pp. 1–4.

Jeff Schler, "Neither snow nor ice nor earthquakes . . . ," SME Conference, *Advanced Composites*, Mar./Apr. 1994, pp. 22–24.

Thomas, Colin R., "What are Carbon–Carbon Composites and What Do They Offer?," in *Essentials of Carbon–Carbon Composites*, C. R. Thomas (editor), Royal Society of Chemistry, Cambridge, pp. 1–36 (1993).

Fisher, Ronald, "Manufacturing Considerations for Carbon–Carbon," in *Essentials of Carbon–Carbon Composites*, C. R. Thomas (editor), Royal Society of Chemistry, Cambridge, pp. 103–117 (1993).

Murdie, N., C. P. Ju, J. Don, and M. A. Wright, "Carbon–Carbon Matrix Materials," in *Carbon–Carbon Materials and Composites*, J.D. Buckley (editor), Noyes Publications, New York, pp. 105–168 (1989).

McAllister, L. E., "Multidimensionally reinforced Carbon/Graphite Matrix Composites," in *Engineered Materials Handbook –Composites*, Theodore J. Reinhart (Technical Chariman), ASM International, Metals Park, Ohio, pp. 915–919 (1987).

Rand, Brian, "Matrix Precursors for Carbon Composites," in *Essentials of Carbon–Carbon–Carbon Composites*, C. R. Thomas (editor), Royal Society of Chemistry, Cambridge, pp. 67–102 (1993).

Klett, J. W., "High Thermal Conductivity Carbon/Carbon Composites," Ph. D. Dissertation, Clemson University, Clemson, SC (1994). (Abstract only).

White, J. L. and P. M. Sheaffer, *Carbon*, 27: 697 (1989).

*Primary Examiner*—Adrienne C. Johnstone
*Attorney, Agent, or Firm*—Ivan L. Ericson

[57] ABSTRACT

A densified carbon matrix carbon fiber composite preform is made by vacuum molding an aqueous slurry of carbon fibers and carbonizable organic powder to form a molded part. The molded part is dried in an oven at 50° C. for 14 hours and hot pressed at 2000 psi at 400° C. for 3 hours. The hot pressed part is carbonized at 650° C. under nitrogen for 3 hours and graphitized at 2400° C. to form a graphitic structure in the matrix of the densified carbon matrix carbon fiber composite preform. The densified preform has a density greater than 1.1 g/cc.

20 Claims, 12 Drawing Sheets

METHOD FOR RAPID FABRICATION OF FIBER PREFORMS AND STRUCTURAL COMPOSITE MATERIALS

This invention was made with Government support under contract DE-AC05-84OR21400 awarded by the U.S. Department of Energy to Martin Marietta Energy Systems, Inc. and the Government has certain rights in this Invention.

FIELD OF THE INVENTION

The present invention relates to a method for making densified composites, more particularly, to a method for making densified carbon matrix carbon fiber composite preforms.

BACKGROUND OF THE INVENTION

Carbon—carbon composites are widely used as friction materials in aircraft braking systems, where their high thermal conductivity, large heat capacity and excellent friction and wear behavior lead to significantly improved aircraft braking performance. Consequently, large commercial aircraft (e.g. Boeing 747, 757, and 767) and all military aircraft utilize carbon—carbon composites in their braking systems. The manufacturing process for carbon—carbon composites is very lengthy, thus carbon—carbon composites are extremely expensive. Typically, a preform is prepared by hand lay-up of woven carbon fiber fabric, or by hot pressing a mixture of chopped carbon fibers and resin (prepreg). The preform is then densified by repetitive liquid impregnation with pitch or resin as discussed in the following articles: Thomas, Colin R., "What are Carbon—Carbon Composites and What Do They Offer?," in *Essentials of Carbon— Carbon Composites*, C. R. Thomas (editor), Royal Society of Chemistry, Cambridge, p. 1–36 (1993) and Fisher, Ronald, "Manufacturing Considerations for Carbon— Carbon," in *Essentials of Carbon—Carbon Composites*, C. R. Thomas (editor), Royal Society of Chemistry, Cambridge, p. 103–117 (1993)., or by carbon vapor infiltration as discussed in Thomas' article and in Murdie, N., C. P. Ju, J. Don, and M. A. Wright, "Carbon—Carbon Matrix Materials," in *Carbon—Carbon Materials and Composites*, J. D. Buckley (editor), Noyes Publications, New York, p. 105–168 (1989), followed by carbonization and graphitization as described by Huttinger, K. J., "Theoretical and Practical Aspects of Liquid-Phase Pyrolysis as a Basis of the Carbon Matrix of CFRC," in *Carbon Fibers, Filaments and Composites*, Figueiredo (editor), Kluwer Academic Publishers, Boston, p. 301–326 (1990) and Rand, Brian, "Matrix Precursors for Carbon—Carbon Composites," in *Essentials of Carbon—Carbon Composites*, C. R. Thomas (editor), Royal Society of Chemistry, Cambridge, p. 67–102 (1993). Up to 5 cycles of repeated densification/ carbonization can be required to achieve the desired density of 1.8 g/cc as discussed in McAllister, L. E., "Multidimensionally reinforced Carbon/Graphite Matrix Composites," in *Engineered Materials Handbook—Composites*, Theodore J. Reinhart (Technical Chariman), ASM International, Metals Park, Ohio, p. 915–919 (1987), which can take 6 to 9 months. The high cost of carbon—carbon composites has so far restricted the widespread application of these materials to aircraft brakes and other applications that are performance driven, or are relatively cost insensitive. However, the utility of carbon—carbon composites has been demonstrated in the high performance racing vehicle arena discussed by Fisher. Modern Formula One racing cars use carbon—carbon brakes and clutches because of their significantly improved performance and wear characteristics discussed by Fisher. These benefits could readily be transferred to the commercial sector if the cost of manufacture could be substantially reduced. Commercial sector applications include clutch and braking systems for heavy trucks, or railroad locomotives and railcars. Moreover, within the military sector there are numerous applications on fighting vehicles (tanks, armored cars, self propelled artillery, etc.) for brakes and clutches. The technology disclosed here relates to an innovative process for the fabrication of carbon—carbon composites that offers potentially large reductions in processing time, allowing finished carbon—carbon composite brake discs to be fabricated in 1–4 weeks, compared to the more usual 24 plus weeks. Obviously, commensurate reductions in cost can be realized.

OBJECTS OF THE INVENTION

Accordingly, it is an object of the present invention to provide a new and improved method for fabrication of carbon or ceramic fiber preforms and structural composite materials. Further and other objects of the present invention will become apparent from the description contained herein.

SUMMARY OF THE INVENTION

In accordance with one aspect of the present invention, a new and improved method for making a densified carbon matrix carbon fiber composite preform comprises the following steps:

Step 1. Provide an aqueous slurry of carbon fibers, carbonizable organic powder, a rigidizer and a dispersent. The rigidizer has a softening point temperature range and a volatilization temperature range.

Step 2. Vacuum mold the slurry to form a molded part.

Step 3. Dry the molded part at a temperature greater than the softening point temperature range of the rigidizer and a temperature less than the volatilization temperature range of the rigidizer to form a dry rigidized molded part which has the carbon fibers uniformly dispersed and randomly oriented therein.

Step 4. Hot press the dry rigidized molded part to form a hot pressed part.

Step 5. Carbonize the hot pressed part under an inert atmosphere for a time and temperature sufficient to form a densified carbon-bonded carbon fiber composite preform.

In accordance with another aspect of the present invention, a new and improved densified carbon martix carbon fiber composite preform made by a method comprises the following steps:

Step 1. Provide an aqueous slurry of carbon fibers, carbonizable organic powder, a rigidizer and a dispersent. The rigidizer has a softening point temperature range and a volatilization temperature range.

Step 2. Vacuum mold the slurry to form a molded part.

Step 3. Dry the molded part at a temperature greater than the softening point temperature range of the rigidizer and a temperature less than the volatilization temperature range of the rigidizer to form a dry rigidized molded part which has the carbon fibers uniformly dispersed and randomly oriented therein.

Step 4. Hot press the dry rigidized molded part to form a hot pressed part.

Step 5. Carbonize the hot pressed part under an inert atmosphere for a time and temperature sufficient to form a densified carbon matrix carbon fiber composite preform.

For a better understanding of the present invention, together with other and further objects, advantages and capabilities thereof, reference is made to the following disclosure and appended claims in connection with the above described drawings.

DETAILED DESCRIPTION OF THE PREFERRED EMBODIMENTS

A novel process for the rapid manufacture of carbon—carbon composite friction materials for aircraft and other commercial braking systems is described. The process involves the fabrication of, via a slurry molding technique, a fibrous preform containing chopped or milled carbon fibers having a length from about 10 µm to about 10 mm and a resin or mesophase pitch binder. The preform is subsequently hot-pressed to near-final density followed by carbonization and graphitization. The fiber distribution achieved in the hot-pressed composite is relatively random and there is no apparent fiber damage arising from the hot-pressing operation. The utilization of mesophase pitch for the binder/impregnant assures the final product has enhanced thermal conductivity and improved friction and wear properties. A final CVI densification step, if required, would allow the density to be increased to >1.8 g/cc. Fabrication of carbon—carbon composite friction materials via the route described here results in substantial reductions in processing time by eliminating repetitive liquid impregnations or lengthy CVI processing steps. Commensurate reductions in materials fabrication costs are anticipated.

The following is a technique for manufacturing a rigid preform with PAN fibers and a phenolic resin. The targeted density is 1.0 g/cc, ideal for densification by the CVI method.

METHOD A

1. Select appropriate fiber length.
2. Mix chopped carbon fibers with resin powder and slurry in water.
3. Vacuum mold into part with desired shape.
4. Dry molded part in convection oven for 14 hours @ 50° C. and remove from molding fixture.
5. Hot press in a matched mold at pressures up to 2000 psi, 130° C., and hold for 3 hours.
6. Carbonize for 3 hours under nitrogen to pyrolize the resin binder.

Figure 1:
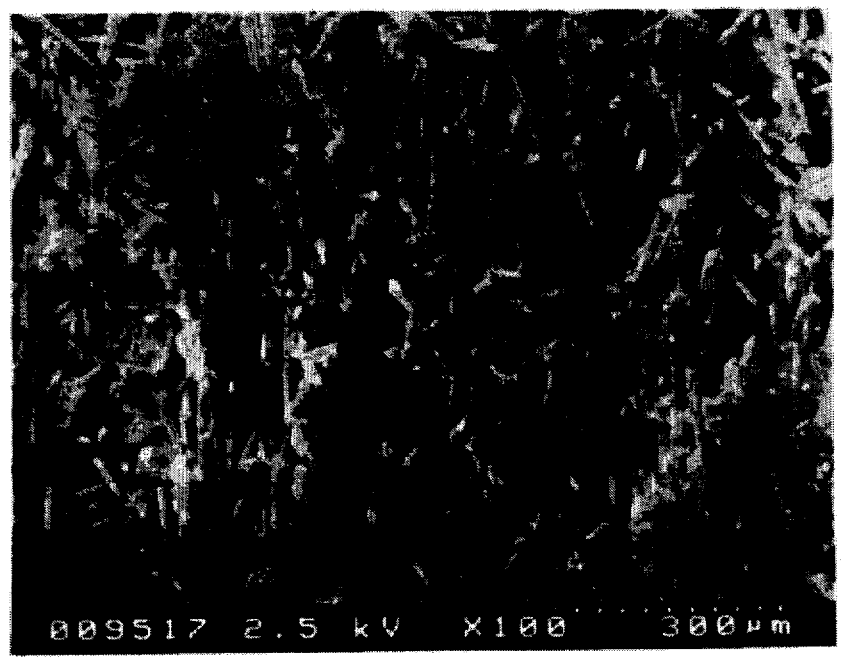
FIG. 1. is a 100X SEM micrograph of a section through an as-molded and dried part in accordance with the present invention.
Figure 2:
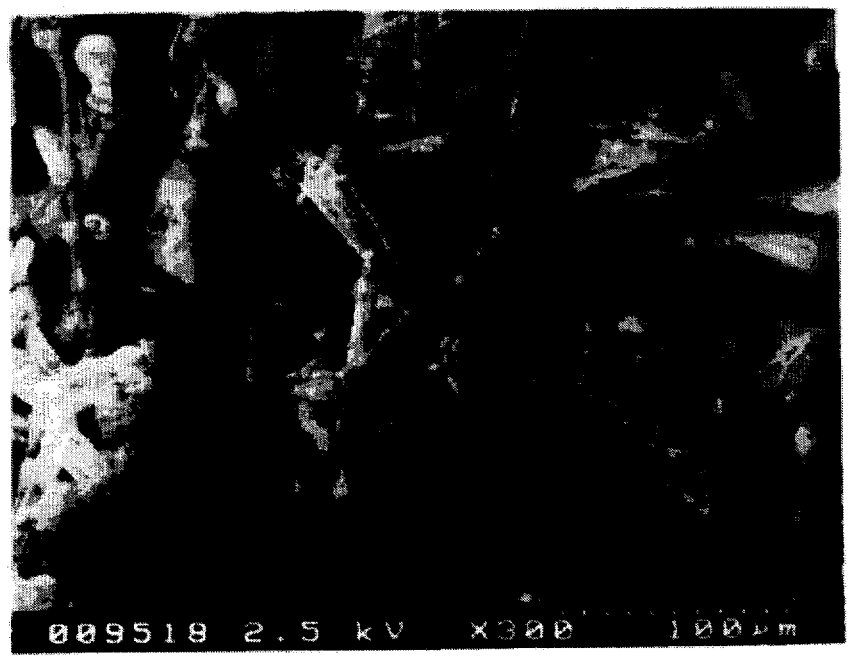
FIG. 2. is a 300X SEM micrograph of a section through the as-molded and dried part of FIG. 1 in accordance with the present invention.
Figure 3:
FIG. 3. is a high resolution SEM micrograph of a section through the as-molded and dried part of FIG. 1 in accordance with the present invention.
Figure 4:
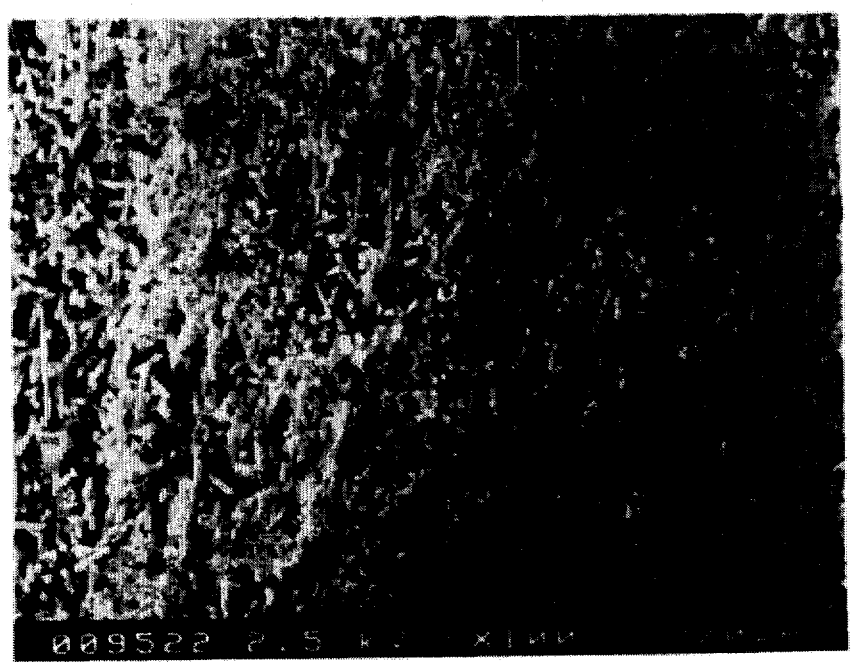
FIG. 4. is a 100X SEM micrograph of a section through a hot pressed preform at 130° C. in accordance with the present invention.
Figure 5:
FIG. 5. is a 300X SEM micrograph of a section through a hot pressed preform at 130° C. of FIG. 4 in accordance with the present invention.
Figure 6:
FIG. 6. is a high resolution SEM micrograph of a section through a hot pressed preform at 130° C. of FIG. 4 in accordance with the present invention.
Figure 7:
FIG. 7. is a 100X SEM micrograph of a section through the carbonized part (600° C.) in accordance with the present invention.
Figure 8:
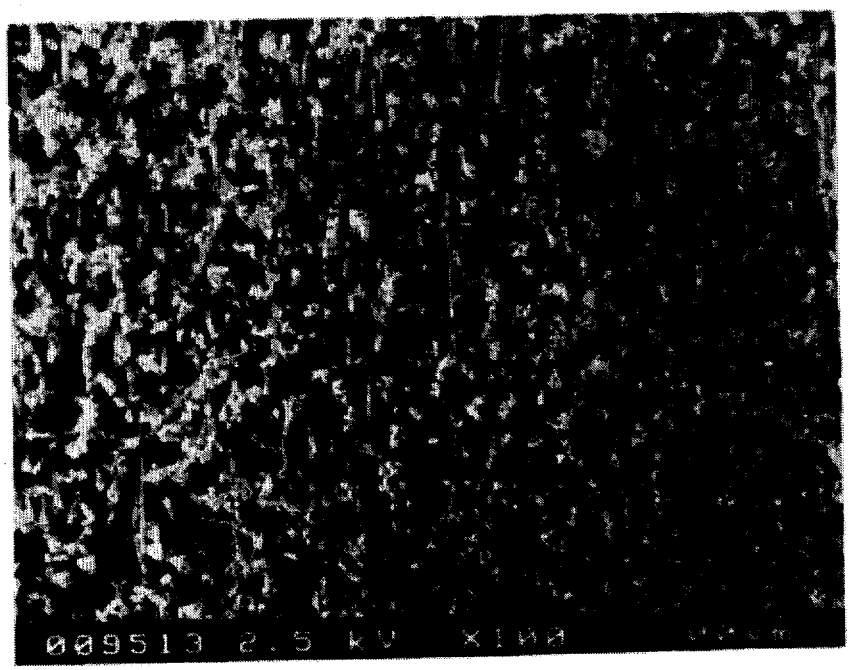
FIG. 8. is a 300X SEM micrograph of a section through the carbonized part (600° C.) of FIG. 7. in accordance with the present invention.
Figure 9:
FIG. 9. is a high resolution SEM micrograph of a section through the carbonized part (600° C.) of FIG. 7 in accordance with the present invention.
Figure 10:
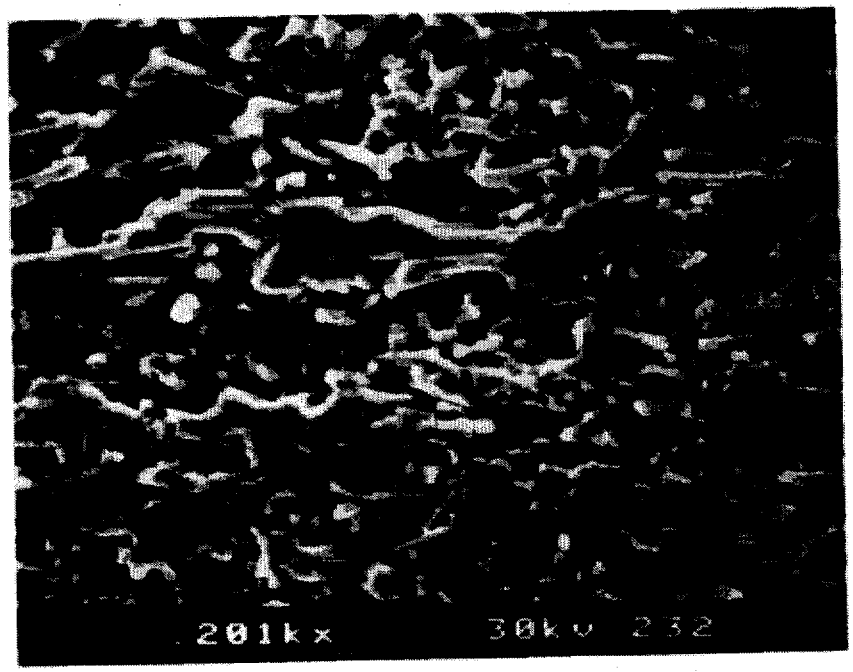
FIG. 10. is a 200X SEM micrograph of a section through a hot pressed and carbonized composite in accordance with the present invention.
Figure 11:
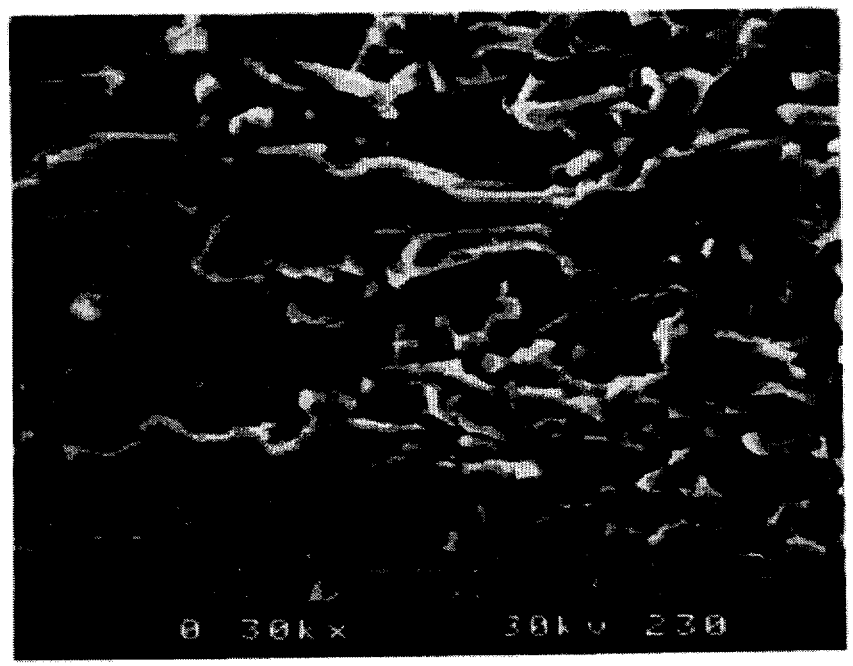
FIG. 11. is a 300X SEM micrograph of a section through the hot pressed and carbonized composite of FIG. 10 in accordance with the present invention.
Figure 12:
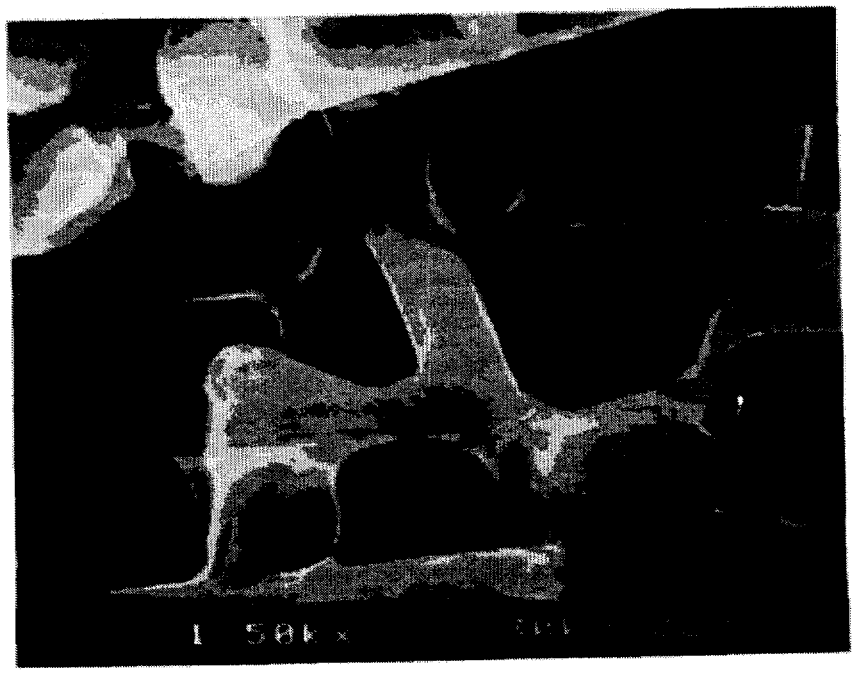
FIG. 12. is a high resolution SEM micrograph of a section through the hot pressed and carbonized composite of FIG. 10 in accordance with the present invention.

Several preforms having densities ranging from about 0.5 g/cc to about 1.3 g/cc were made using method A to show the viability of the process. FIGS. 1, 2 and 3 are SEM micrographs, (X100, X300 and high resolution respectively) of a section through the as-molded and dried part ($\rho$=0.21 g/cc) made from the slurry. As shown in the SEM micrographs the fibers are oriented in a random fashion, allowing for improved strength and thermal conductivity in the transverse direction. FIGS. 4, 5 and 6 are SEM micrographs, (X100, X300 and high resolution respectively) of a section through a hot pressed part ($\rho$=1.10 g/cc). As can be seen, there was no fiber damage during pressing and the fibers still appear to be oriented in a completely random fashion. FIGS. 7, 8 and 9 are SEM micrographs, (X100, X300 and high resolution respectively) of a section through a carbonized part ($\rho$=0.67 g/cc) and, as can be seen, there is still significant open porosity for proper channeling of gas during the CVI densification step. The preform density can be controlled by adjusting the pressing pressure during step 5. FIGS. 10, 11 and 12 are SEM micrographs, (X200, X300 and high resolution respectively) of a section through a carbonized part made from mesophase pitch as the matrix precursor ($\rho$=1.1 g/cc) and, as can be seen, the pitch derived carbon is uniformly deposited on the fibers, causing a significant decrease in the open porosity. The uniform dispersion of the fibers throughout the material is evident.

Other researchers have shown that when a mesophase pitch is used as a matrix precursor, densities of the final part are at least 1.5 g/cc and can reach as a high as 1.7 g/cc upon graphitization to 2400° C. Klett , J. W., "High Thermal Conductivity Carbon/Carbon Composites," Ph. D. Dissertation, Clemson University, Clemson, S.C. (1994) and White, J. L. and P. M. Sheaffer, *Carbon,* 27: 697 (1989).

It is important to note that method A is without any densification steps. Therefore, a further process which uses pitch (or PAN) fibers with a mesophase pitch matrix precursor via method B is described below.

METHOD B

1. Select appropriate carbon fiber (PAN or Pitch) and length.
2. Mix chopped carbon fibers with mesophase pitch powder and a rigidizer (such as polyethylene glycol) and slurry the mixture in water. A surfactant or dispersant (such as 2-butoxyethanol) may be needed to promote dispersion of the pitch powder in the water.
3. Vacuum mold into part with desired shape.

4. Dry molded part in convection oven for 14 hours @ 50° C. and remove from molding fixture.

5. Hot press in a matched mold at pressures up to 2000 psi, 650° C., and hold for 3 hours.

6. Carbonize for 3 hours under nitrogen to pyrolize the pitch binder.

7. Graphitize at 2400° C. to develop graphitic structure in the matrix and improve thermal conductivity and mechanical strength.

Another example for making a densified carbon matrix carbon fiber composite preform comprises the following steps:

Step 1. Provide an aqueous slurry of carbon fibers, carbonizable organic powder, a rigidizer and a dispersant. The rigidizer has a softening point temperature range and a volatilization temperature range. The carbon fibers are made from a material such as rayon, polyacrylonitrite, isotropic pitch, mesophase pitch, and mixtures thereof. The carbon fibers are comminuted by a process such as chopping and milling. The carbon fibers have an aspect ratio equal to or greater than 20:1, a length equal to or less than 10 mm and a diameter from about 6 µm to about 16 µm. The chopped carbon fibers have a length of about 1 mm to about 10 mm. The milled carbon fibers having a mean length greater than about 100 µm and less than about 400 µm, more specifically, from about 200 µm to about 400 µm. The carbonizable organic powder is selected from the group consisting of mesophase pitch powder, powdered isotropic pitch, a phenolic resin, and mixtures thereof and has a mean powder size from about 30 µm to about 100 µm.

Table 1 lists the ranges of the softening point temperatures and volatilization temperatures of the various carbonizable organic powders that were or can be used in the instant invention.

TABLE 1

| Carbonizable Organic Powder | Softening Point Temperature | Volatilization Temperature |
| --- | --- | --- |
| Mesophase Pitch | 230° C.–380° C. | 400° C.–650° C. |
| Isotropic Pitch | 130° C.–200° C. | 400° C.–650° C. |
| Phenolic Resin | 50° C.–75° C. | 400° C.–650° C. |

The dispersant is selected from the group consisting of 2 butoxyethanol, liquid detergent, isopropanol, and mixtures thereof. The rigidizer is a water soluble organic solid having a softening point in the temperature range equal to or greater than about 49° C. to about 91° C. and a volatilization temperature range equal to or less than about 140° C. to about 200° C. The rigidizer is selected from a group such as paraffin wax, polyethylene glycol, and mixtures thereof.

Step 2. Vacuum mold the slurry to form a molded part.

Step 3. Dry the molded part at a temperature greater than the softening point temperature range of the rigidizer and a temperature less than the volatilization temperature range of the rigidizer to form a dry rigidized molded part which has the carbon fibers uniformly dispersed and randomly oriented therein. The drying step comprises heating the molded part at 75° C. for 14 hours.

Step 4. Hot press in matched molds the dry rigidized molded part at a pressure from about 200 psig to about 2,000 psig and at a temperature from about 130° C. to about 400° C. to form a hot pressed part. The particular hot pressing temperature will depend upon which carbonizable organic powder is use. It is important that the particular carbonizable organic powder is softened sufficiently to allow complete flow throughout the rigidized molded part. In addition, it is important that the particular rigidizer is removed during the process to prevent contamination by residuals. More specifically the hot pressing comprises pressing the dry molded part in a matched mold at pressures up to 2000 psi and at a temperature of about 130° C. to about 300° C. for 3 hours or the hot pressing comprises, in addition, the carbonization of the hot pressed part in-situ in matched molds in a hot press at temperatures in the range from about 400° C. to about 650° C. or greater than 650° C. at pressures up to about 2000 psi.

Step 5. Carbonize the hot pressed part under an inert atmosphere for a time and temperature sufficient to form a densified carbon matrix carbon fiber composite preform. The carbonizing is done under nitrogen for 3 hours and temperatures in the range of about 650° C. to about 1000° C. The densified carbon matrix carbon fiber composite preform has a density greater than 1.1 g/cc.

The densified carbon matrix carbon fiber composite preform is graphitized at 2400° C. to form a densified carbon-bonded carbon fiber composite having a matrix with a graphitic structure.

Based on the data taken (FIGS. 2–4) from our material, several observations can be made. Rigid monolithic preforms can be made with significant open porosity suitable for densification by the CVI method. Preforms can be hot pressed easily without fiber damage and still retain a random fiber orientation. Process time can be potentially an order-of-magnitude shorter than current manufacturing techniques and much less labor intensive. This process can be used, with mesophase pitch, to form dense parts in a single hot pressing step, dramatically reducing fabrication time and part cost. This is demonstrated in FIG. 12 where the mesophase pitch derived carbon is uniformly deposited on the fibers, thereby reducing the entrained porosity.

Traditional c/c brake manufacture takes approximately 6 months. The use of the technology disclosed herein to manufacture a rigid preform, and CVI densification can reduce the fabrication time to approximately 1 or 2 months. Furthermore, pressure carbonization of pitch-based preforms could possibly reduce the fabrication time to approximately one week. Therefore, an advantage of this process is a significant reduction of fabrication time.

Carbon/carbon fabricated with this technique will possess a random distribution and orientation of the milled fibers, producing a very homogeneous material. Such a material will exhibit superior thermal and mechanical properties to those fabricated by conventional techniques. Rapid fabrication of carbon/carbon brake discs will result in less expensive brake assemblies and, therefore, possible penetration of high volume markets such as passenger automobiles.

Unique features and advantages of this invention are: Traditional c/c brake manufacture takes approximately 6 months whereas the use of the technology disclosed herein to manufacture a rigid preform, and CVI densification can reduce the fabrication time to approximately 1 or 2 months. Furthermore, pressure carbonization of pitch-based preforms could possibly reduce the fabrication time to approximately one week. Therefore, an advantage of this process is a significant reduction of fabrication time.

Possible alternative versions and/or uses of the invention include the following: large machinable c/c parts; fabrication of preforms with complex shapes for densification by CVI or melt impregnation (this process can be used to fabricate c/c with oxidation inhibitors or other additives homogeneously distributed throughout the part); pistons for combustion engines; heat shields for re-entry vehicles; turbine rotors; RF antenna reflectors; integral fixation of bone fractures; hip joint replacements and/or bio-implants.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of making a densified carbon matrix carbon fiber composite preform comprising the following steps:

Step 1. providing an aqueous slurry comprising carbon fibers, carbonizable organic powder and a rigidizer, said rigidizer having a softening point temperature range and a volatilization temperature range;

Step 2. vacuum molding said slurry to form a molded part;

Step 3. drying said molded part at a temperature greater than said softening point temperature range of said rigidizer and a temperature less than said volatilization temperature range of said rigidizer to form a dry rigidized molded part having said carbon fibers uniformly dispersed and randomly oriented therein;

Step 4. hot pressing said dry rigidized molded part to form a hot pressed part; and Step 5. carbonizing said hot pressed part under an inert atmosphere for a time and temperature sufficient to form a densified carbon matrix carbon fiber composite preform.

2. A method of making a densified carbon matrix carbon fiber composite preform comprising the following steps:

Step 1. providing an aqueous slurry of carbon fibers, carbonizable organic powder, a rigidizer and a dispersant, said rigidizer having a softening point temperature range and a volatilization temperature range;

Step 2. vacuum molding said slurry to form a molded part;

Step 3. drying said molded part at a temperature greater than said softening point temperature range of said rigidizer and a temperature less than said volatilization temperature range of said rigidizer to form a dry rigidized molded part having said carbon fibers uniformly dispersed and randomly oriented therein;

Step 4. hot pressing said dry rigidized molded part at a pressure from about 200 psig to about 2,000 psig and at a temperature from about 130° C. to about 400° C. to form a hot pressed part; and Step 5. carbonizing said hot pressed part under an inert atmosphere for a time and temperature sufficient to form a densified carbon matrix carbon fiber composite preform.

3. A method in accordance with claim 2 wherein said carbon fibers are made from a material selected from the group consisting of: rayon, isotropic pitch, mesophase pitch, polyacrylonitrile, and mixtures thereof.

4. A method in accordance with claim 2 wherein said carbon fibers are comminuted by a process selected from the group consisting of: chopping, milling, and combinations thereof.

5. A method in accordance with claim 2 wherein said carbon fibers have a length of about 100 μm to about 400 μm and an aspect ratio equal to or greater than 20:1.

6. A method in accordance with claim 2 wherein said carbon fibers are chopped carbon fibers having a length of about 1 mm to about 10 mm and a diameter from about 6 μm to about 16 μm.

7. A method in accordance with claim 2 wherein said carbon fibers are milled carbon fibers having a mean length greater than about 10 μm and less than about 400 μm and a diameter from about 6 μm to about 16 μm.

8. A method in accordance with claim 2 wherein said carbon fibers have a length equal to or less than 10 mm.

9. A method in accordance with claim 2 wherein said carbonizable organic powder is selected from the group consisting of mesophase pitch powder, powdered isotropic pitch, a phenolic resin, and mixtures thereof.

10. A method in accordance with claim 2 wherein said carbonizable organic powder has a mean powder size from about 30 μm to about 100 μm.

11. A method in accordance with claim 2 wherein said dispersant is selected from the group consisting of 2 butoxyethanol, liquid detergent, isopropanol, and mixtures thereof.

12. A method in accordance with claim 2 wherein said drying step comprises heating said molded part from Step 2 at 50° C. for 14 hours.

13. A method in accordance with claim 2 wherein said rigidizer is a water soluble organic solid having a softening point temperature range equal to or greater than about 49° C. to about 91° C. and a volatilization temperature range equal to or less than about 140° C. to about 200° C.

14. A method in accordance with claim 2 wherein said rigidizer is selected from the group consisting of paraffin wax, polyethylene glycol, and mixtures thereof.

15. A method in accordance with claim 2 wherein said densified carbon matrix carbon fiber composite preform has a density greater than 1.1 g/cc.

16. A method in accordance with claim 2 wherein said hot pressing comprises pressing said dry molded part in a matched mold at pressures up to 2000 psi and at a temperature of 130° C. for 3 hours.

17. A method in accordance with claim 2 wherein said carbonizing is done under nitrogen for 3 hours.

18. A method in accordance with claim 2 wherein said carbonizable organic powder is a mesophase pitch powder.

19. A method in accordance with claim 2 wherein said densified carbon matrix carbon fiber composite preform is graphitized at 2400° C. to form a densified carbon matrix carbon fiber composite having a matrix with a graphitic structure.

20. A method in accordance with claim 2 wherein said hot pressing comprises carbonizing said dry molded part in-situ in a matched mold at pressures up to 2000 psi and at a temperature from about 400° C. to about 650° C.

* * * * *